United States Patent [19]

Speeds et al.

[11] 4,162,292

[45] Jul. 24, 1979

[54] HIGH PRESSURE HYDRAZINE GAS GENERATOR

[75] Inventors: John A. Speeds, San Jose, Costa Rica; Robert D. Marcy, Chatsworth, Calif.

[73] Assignee: The United States of America as represented by the Secretary of the Air Force, Washington, D.C.

[21] Appl. No.: 844,082

[22] Filed: Oct. 20, 1977

[51] Int. Cl.² ........................... B01J 7/02; F02C 3/24; F02K 7/08

[52] U.S. Cl. ............................ 422/206; 60/39.46 M; 422/49; 422/211; 422/236

[58] Field of Search .................... 23/281, 282; 60/257, 60/258, 259, 260, 39.46 M; 422/236, 211, 206, 49

[56] References Cited

U.S. PATENT DOCUMENTS

| 3,101,589 | 8/1963 | Hamrick et al. | 23/281 X |
| 3,135,703 | 6/1964 | Sill | 23/282 X |
| 3,298,182 | 1/1967 | Webb | 23/281 X |
| 3,303,651 | 2/1967 | Grant et al. | 60/257 X |
| 3,377,140 | 4/1968 | Hall | 23/281 X |
| 3,740,198 | 6/1973 | Sandlin et al. | 23/281 |
| 3,871,828 | 3/1975 | Ellion et al. | 23/281 |
| 4,069,664 | 1/1978 | Ellion et al. | 60/258 |

Primary Examiner—Barry S. Richman
Attorney, Agent, or Firm—Joseph E. Rusz; Jacob N. Erlich

[57] ABSTRACT

A high pressure hydrazine gas generator having a decomposition chamber which contains therein an initiator of $I_2O_5$ crystals and a plurality of heat retaining balls. The liquid hydrazine which is initially introduced into the decomposition chamber, ignites upon contact with the initiator and creates a high temperature within the decomposition chamber. This high temperature is maintained within the chamber by the heat retaining balls and therefore sustains decomposition of the liquid hydrazine into gases which are emitted from the generator under extremely high pressure.

9 Claims, 2 Drawing Figures

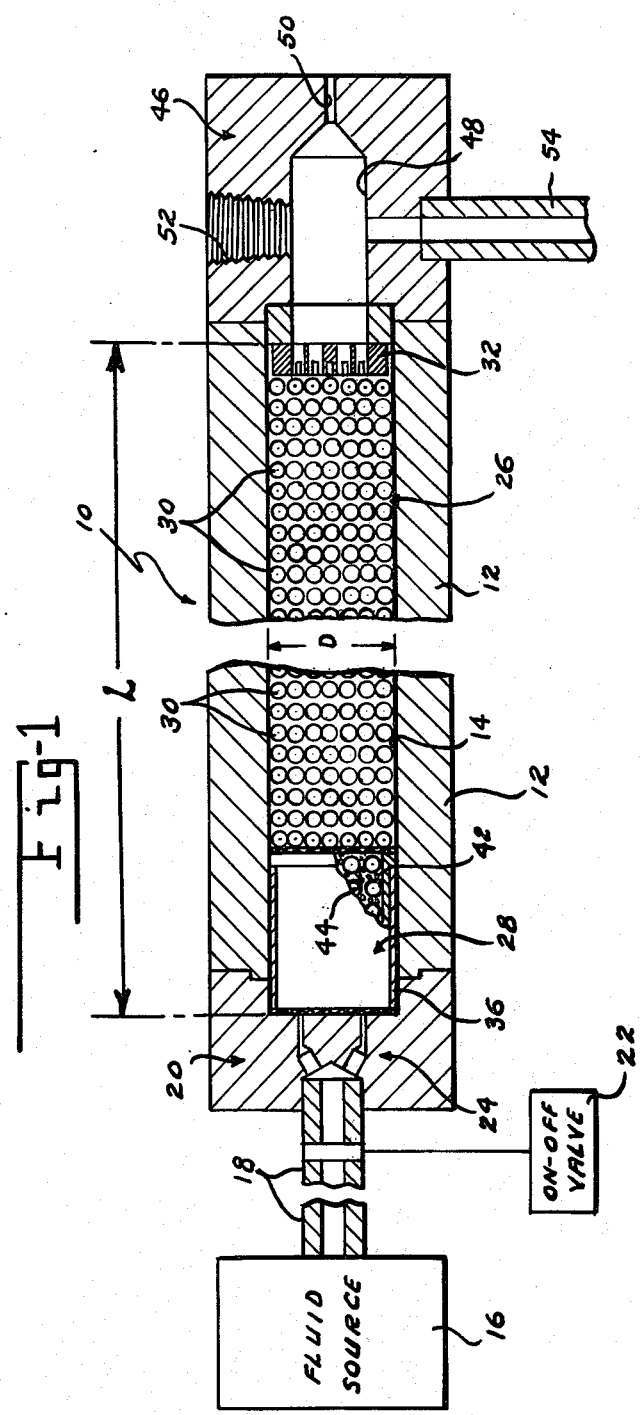

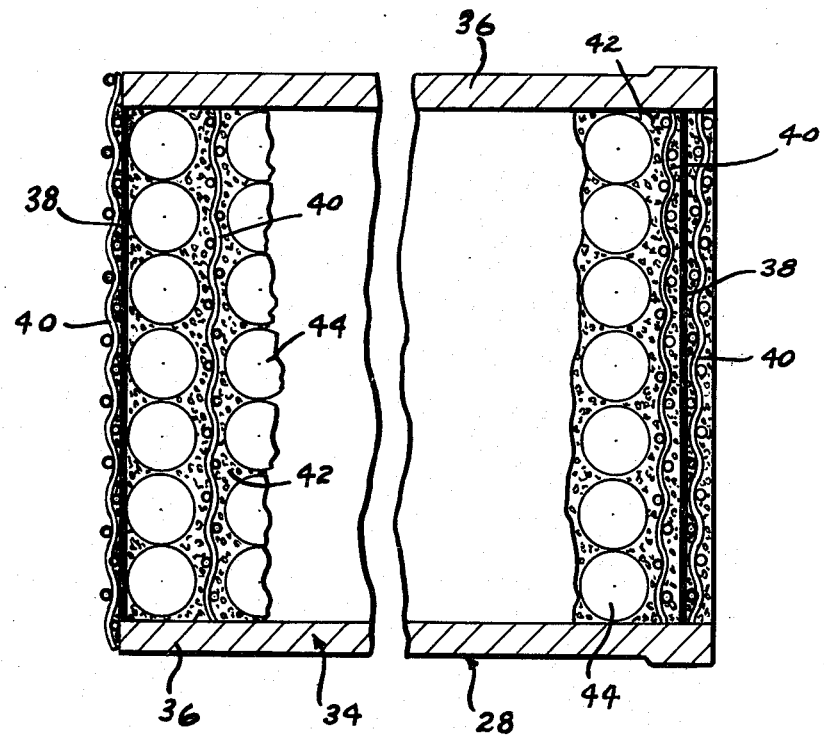

HIGH PRESSURE HYDRAZINE GAS GENERATOR

STATEMENT OF GOVERNMENT INTEREST

The invention described herein may be manufactured and used by or for the Government for governmental purposes without the payment of any royalty thereon.

BACKGROUND OF THE INVENTION

This invention relates generally to a high pressure gas source, and, more particularly, to a hydrazine thermal bed gas generator which utilizes the heat capacity of heat retaining balls to sustain the heat required for the continued decomposition of hydrazine in order to produce gas under extremely high pressure.

Hydrazine gas generators are being extensively used for the generation of a heated gas discharge utilized primarily for the mode of power of vehicles either supported on land, water or in the air. The hydrazine gas generator operates on the principal of distributing liquid hydrazine into a decomposition chamber and the subsequent exothermic conversion of the hydrazine into gaseous products and heat, together with the discharge thereof through a nozzle to produce thrust. Many methods have been utilized to distribute the liquid, these include submerging liquid distribution nozzle outlets deep within the bed of a catalyst material, utilizing small diameter capillary tubes as liquid flow control paths to deliver the liquid hydrazine to selected locations within the bed of catalyst material and separating the entering liquid into several paths by passage of the liquid through a distribution screen.

Generally the decomposition of the liquid hydrazine into high temperature ammonia, hydrogen and nitrogen gases has previously been accomplished by causing the hydrazine to flow in contact with a catalyst material such as that produced by the Shell Oil Company under the name "Shell 405 Catalyst" which initiates and sustains the decomposition process. An example of such a hydrazine gas generator is found in U.S. Pat. No. 3,871,828.

It has been contemplated that a liquid-model propellant hydrazine-fuel pressure source might be desirable for the transpiration cooled nose tip pressurization system of, for example, ballistic reentry systems. The potential advantage of such a system resides in its ease of controllability to accommodate cooling modes as compared to solid propellants. The major concern of such a hydrazine system is in the feasibility of hydrazine gas generators of the past being capable of successful operation in the required 8000 psig level. Unfortunately, the systems now in use and as set forth in U.S. Pat. No. 3,871,828 operate solely under the influence of catalytic pellets and at normal (100–1000 psig) pressure levels. It is therefore necessary to construct a hydrazine gas generator which meets the high pressure criteria set forth hereinabove and would therefore be capable of producing the required output.

SUMMARY OF THE INVENTION

The high pressure hydrazine gas generator of this invention overcomes the problems set forth hereinabove by providing a gas generator which utilizes the heat capacity of heat retaining balls while operating at extremely high pressure in a pulsed mode with varying on/off ratios to effect a 6:1 output flow range.

The hydrazine gas generator of this invention is capable of being operatively connected to a housing which contains a coolant fluid, and as a result thereof expell the coolant fluid under high pressure. The instant gas generator is made up of a housing which includes therein a thermal bed located adjacent the hydrazine liquid source. Located within the thermal bed portion of the generator is the initiator section through which the dual orifices of the hydrazine injector allows the flow of liquid hydrazine to pass. The initiator section of the generator of this invention includes an initiator pack which contains therein alternate layers of $I_2O_5$ crystals and heat retaining and supporting balls. Adjacent the initiator section and within the remaining portion of the thermal bed is found a plurality of heat retaining CRES 440 C Balls. Since the initiator pack is a separate element located within the thermal bed, the initiator pack may be replaced after the depletion of the $I_2O_5$ initiator within impairment of the remainder of the gas generator operation thereby maintaining efficient overall operability of the hydrazine gas generator of this invention.

In operation, liquid hydrazine flows in a pulsed manner through the initiator pack causing a chemical reaction to take place between the liquid hydrazine and the $I_2O_5$ crystals. This reaction generates sufficient heat to ignite the hydrazine and heat the thermal bed and heat retaining balls to a temperature to sustain hydrazine decomposition. Continued flow through the thermal bed, once the thermal bed and heat retaining balls are hot, will continue to decompose the liquid hydrazine without subsequent burning. This decomposition also emits heat, thus sustaining further decomposition. The resultant gas under extremely high pressure is emitted through a discharge opening located adjacent the rear of the thermal bed and into, for example, a tank containing a coolant supply.

It is therefore an object of this invention to provide a hydrazine gas generator which operates under extremely high pressure.

It is a further object of this invention to provide a hydrazine gas generator which utilizes for its initiation the chemical reaction between the hydrazine and $I_2O_5$ crystals.

It is still another object of this invention to provide a hydrazine gas generator which maintains the decomposition of hydrazine with the utilization of heat retaining balls.

It is still a further object of this invention to provide a hydrazine gas generator which is economical to produce and which utilizes conventional currently available components that lend themselves to standard mass producing manufacturing techniques.

For a better understanding of the present invention, together with other and further objects thereof, reference is made to the following description taken in conjunction with the accompanying drawing and its scope will be pointed out in the appended claims.

DETAILED DESCRIPTION OF THE DRAWING

FIG. 1 of the drawing is a side elevational view, shown partly in cross-section and in schematic fashion, of the hydrazine gas generator of this invention; and FIG. 2 of the drawing is a side elevational view, shown partly in cross-section of the initiator pack utilized with the hydrazine gas generator of this invention.

DETAILED DESCRIPTION OF THE PREFERRED EMBODIMENT

Reference is now made to FIG. 1 of the drawing which best illustrate the hydrazine gas generator 10 of this invention. Generator 10 is constructed of an elongated housing 12 made of any suitable high strength material such as Haynes 188 steel. A hollow interior portion 14 is formed within housing 12 and will be described in greater detail hereinbelow. Any suitable fluid container 16, which in the instant invention holds the liquid hydrazine, is operatively connected by way of line or tubing 18 to the forward section 20 of housing 12. A conventional ON-OFF valve 22 is interposed between container 16 and generator 10 within line 18 in order to allow for the pulsed flow of liquid hydrazine into gas generator 10 in a manner and for the purposes described in detail hereinbelow.

Connected to input line 18 and located within the forward section 20 of generator 10 is a dual orifice injector 24. Dual orifice injector 24 allows liquid hydrazine to pass into the hollow interior portion 14 of generator 10 with a minimal of "popping" taking place within injector 24. The term "popping" in this instance refers to the sound heard when a hydrazine gas generator experience rapid and repeated pressure rises of a magnitude such that is causes a series of audible "explosive-like" noises.

Located within interior 14 of generator 10 and adjacent injector 24 is the thermal bed or decomposition chamber 26 of gas generator 10. Generally, although not limited thereto, thermal bed 26 has an active length, L, of approximately 4 inches and an inner diameter, D, of approximately 0.5 inches. Situated within the forward part of thermal bed 26 and directly adjacent dual orifice injector 26 is an initiator pack 28. The remainder of thermal bed 26 contains a plurality of heat retaining balls 30 of approximately 0.062 inch diameter. Optimum results are obtained with the gas generator 10 of this invention when balls 30 are made of CRES 440 C, a composition made up of constituents having the following percentages:

C: 0.95-1.2
Cr: 16-18
Mo: 0.75 max
Mn: 1.00 max
P: 0.04 max
S: 0.03 max
Si: 1.00 max
Fe: Bal A perforated support plate 32 located at the rear of thermal bed 26 seals balls 30 within thermal bed 26, yet allows the generated gas under pressure to pass therethrough in a uniform manner.

Reference is now made particularly to FIG. 2 and taken in conjunction with FIG. 1 for a detailed description of initiator pack 28. Initiator pack 28 is removably mounted within thermal bed 26 and is in the form of a substantially cylindrical container 34 which is sized to fit within the forward end of thermal bed 26. The side walls 36 of initiator pack 28 are generally made of a high strength material having the ends thereof sealed by a vapor barrier 38 made preferably of 1.5 mil thickness polyethylene and a pair of screens 40, spot welded at each end of initiator pack 28.

Iodine Pentoxide ($I_2O_5$) crystals are utilized in this invention as the initiator 42 for the initial hydrazine ignition. The $I_2O_5$ crystals generally appear as a fine powder, approximately 200-microns in size. Initiator 42 is placed within the initiator pack 28 between vapor barriers 38 where it reacts in a manner to be described below with the first hydrazine propellant introduced through injector 24. The reaction generates sufficient heat to ignite the additionally introduced hydrazine and heat the thermal bed 26 to a temperature capable of sustaining propellant (hydrazine) decomposition. The pressure of the initial introduction of hydrazine is sufficient to rupture vapor barriers 38 and allow the reaction between the liquid hydrazine and $I_2O_5$ to take place.

Also located within initiator pack 28 are a plurality of heat retaining balls 44 made of any suitable material such as K-Monel steel. Balls 44 are generally approximately 0.062 inches in diameter and not only act as a heat retaining means but also act as a spacer for the $I_2O_5$ crystals. Generally seven layers (34 balls per layer) of balls 44 are located within initiator pack 28, the remaining space being filled by the two layers of mesh screen 40, of for example 60×54 mesh, having vapor barrier 38 between them. Approximately 2-3 grams of $I_2O_5$ crystals fill initiator pack 28.

The entire initiator pack 28 is loaded within the front section of thermal bed 26 of gas generator 10 of this invention. Such an approach eliminates a change in the internal configuration of thermal bed 26 after the $I_2O_5$ crystals have been depleted, generally within the first few seconds of generator operation. In addition, because of the heat retaining balls 44 and 30, stability of operation of gas generator 10 continues even after exhaustion of the initiator 42.

Situated at the rear section 46 of generator 10 and in operative relationship with thermal bed 26 is a conduit 48 and an end nozzle 50 of, for example, 0.024 inch diameter. Nozzle 50 is connected to any device which requires the thrust provided by the gas under pressure produced by generator 10. One example of such a device is the pressurized coolant tank (not shown) of a conventional transpiration cooled nose tip pressurization system for ballistic reentry systems. Furthermore, if desired, temperature and pressure taps 52 and 54, respectively, can be provided adjacent conduit 48 in the rear section 46 of generator 10.

Successful operation of the hydrazine gas generator 10 of this invention results in the expulsion of gaseous nitrogen, hydrogen and ammonia at approximately 8000 psig. Such a procedure is accomplished in the instant invention by supplying liquid hydrazine propellant through injector 24 in a pulsed mode into initiator pack 28 of thermal bed 26. The pulsing flow of the hydrazine is controlled by the proper operation of ON-OFF valve 22. Ignition of liquid hydrazine and the subsequent decomposition thereof takes place initially within initiator pack 28 by the combining of the liquid hydrazine with the $I_2O_5$ initiator 42. This reaction causes the thermal bed 26 to reach a temperature of approximately 1600° F. Since the decomposition of hydrazine takes place at between 600°-700° F., the utilization of the heat retaining balls 44 and 30 maintains thermal bed 26 at a temperature sufficient to decompose hydrazine during the pulsed introduction of liquid hydrazine into thermal bed 26. The resultant generated gas, under extremely high pressure (8000 psig) discharge through nozzle 50 into, for example, a pressurized coolant tank.

Although this invention has been described with reference to a particular embodiment, it will be understood to those skilled in the art that this invention is also capable of further and other embodiments within the spirit and scope of the appended claims.

We claim:

1. A high pressure hydrazine thermal bed gas generator comprising a housing, a decomposition chamber situated within said housing, means for introducing liquid hydrazine into said decomposition chamber, a removable initiator pack located within said decomposition chamber, said initiator pack comprising a container having a rupturable vapor barrier constituting at least part of one wall thereof and containing therein material capable of chemically reacting with said liquid hydrazine and producing a high temperature as a result thereof and heat retaining material positioned within said container and adjacent said chemically reacting material, said container being so positioned within said chamber to provide rupture of said vapor barrier by the introduction of said liquid hydrazine, additional heat retaining material located within said decomposition chamber adjacent said initiator pack for maintaining said high temperature generated therein and means located within said housing and operably connected to said decomposition chamber for allowing the expulsion therefrom of gases under extremely high pressure, said gases being generated within said chamber as a result of the decomposition of said liquid hydrazine.

2. A high pressure hydrazine thermal bed gas generator as defined in claim 1 wherein said extremely high pressure is approximately 8,000 psig.

3. A high pressure hydrazine thermal bed gas generator as defined in claim 2 wherein said hydrazine introducing means is in the form of a pair of injectors.

4. A high pressure hydrazine thermal bed gas generator as defined in claim 1 wherein said initiator pack comprises a container having side walls and a pair of ends, said container having a vapor barrier situated at each end thereof for enclosing said chemically reacting material and said heat retaining material therein.

5. A high pressure hydrazine thermal bed gas generator as defined in claim 4 wherein said heat retaining material is in the form of a plurality of metallic balls.

6. A high pressure hydrazine thermal bed gas generator as defined in claim 5 wherein said container further comprises at least one mesh screen located adjacent each of said vapor barriers.

7. A high pressure hydrazine thermal bed gas generator as defined in claim 6 further comprising means operatively connected adjacent said hydrazine introducing means for regulating the flow of hydrazine thereto.

8. A high pressure hydrazine thermal bed gas generator as defined in claim 7 wherein said chemically reacting material is in the form of $I_2O_5$ crystals.

9. A high pressure hydrazine thermal bed gas generator as defined in claim 8 wherein said heat retaining material is in the form of CRES 440C balls.

* * * * *